(12) United States Patent
Mason

(10) Patent No.: US 9,255,851 B2
(45) Date of Patent: Feb. 9, 2016

(54) ENHANCED DEVICE FOR DETERMINING THE LOCATION OF INDUCED STRESS IN STUCK BOREHOLE TUBULARS

(71) Applicant: GE Oil & Gas ESP, Inc., Oklahoma City, OK (US)

(72) Inventor: Guy Harvey Mason, Hook (GB)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 277 days.

(21) Appl. No.: 13/725,444

(22) Filed: Dec. 21, 2012

(65) Prior Publication Data
US 2014/0174191 A1   Jun. 26, 2014

(51) Int. Cl.
G01L 1/12 (2006.01)
E21B 23/00 (2006.01)
E21B 47/09 (2012.01)

(52) U.S. Cl.
CPC . *G01L 1/12* (2013.01); *E21B 23/00* (2013.01); *E21B 47/09* (2013.01); *E21B 47/0905* (2013.01)

(58) Field of Classification Search
CPC ............ G01L 1/12; E21B 43/00; E21B 17/00
USPC ......................................................... 73/779
See application file for complete search history.

(56) References Cited

U.S. PATENT DOCUMENTS

| | | | |
|---|---|---|---|
| 3,056,920 A | 10/1962 | Herrald | |
| 3,233,170 A * | 2/1966 | Rogers | 324/226 |
| 3,690,163 A * | 9/1972 | Shannon et al. | 73/152.56 |
| 4,289,024 A * | 9/1981 | Basham et al. | 73/152.56 |
| 4,708,204 A | 11/1987 | Stroud | |
| 4,766,764 A | 8/1988 | Trevillion | |
| 6,851,476 B2 * | 2/2005 | Gray et al. | 166/301 |
| 7,784,338 B2 * | 8/2010 | Estes | 73/152.56 |
| 7,990,138 B2 | 8/2011 | Martin et al. | |
| 8,035,374 B1 | 10/2011 | Girrell et al. | |
| 8,079,414 B2 | 12/2011 | Smaardyk et al. | |

(Continued)

FOREIGN PATENT DOCUMENTS

| | | |
|---|---|---|
| WO | 2008030620 | 3/2008 |
| WO | 2012093236 | 7/2012 |

OTHER PUBLICATIONS

European Partial Search Report issued in connection with corresponding EP Application No. 13197618.5 on Feb. 20, 2015.

*Primary Examiner* — Lisa Caputo
*Assistant Examiner* — Octavia Hollington
(74) *Attorney, Agent, or Firm* — Crowe & Dunlevy, P.C.

(57) ABSTRACT

A method for identifying the location of a binding zone between a stuck tubular and a borehole includes the steps of passing a demagnetizing stress sensor through the tubular on a baseline magnetization pass to magnetize the tubular. Next, the demagnetizing stress sensor measures a baseline magnetization of the tubular. Once the baseline magnetization has been established, the method continues by applying a stress to the tubular and passing the demagnetizing stress sensor through the tubular on a scanning pass while the tubular is stressed. The demagnetizing stress sensor then measures a stress-induced magnetization of the tubular. The method concludes by comparing the baseline magnetization of the tubular against the stress-induced magnetization of the tubular. Notably, in preferred embodiments, the method includes the magnetization of the tubular in a substantially radial direction and the stresses are applied in vectors perpendicular to the radial magnetization of the tubular.

21 Claims, 6 Drawing Sheets

(56) References Cited

U.S. PATENT DOCUMENTS 8,207,730 B2 * 6/2012 Martin et al. ................. 324/209
8,284,074 B2 * 10/2012 Orban et al. ............... 340/854.2
8,797,033 B1 * 8/2014 Girrell et al. .................. 324/318
2008/0042870 A1 2/2008 Orban et al.
2010/0156403 A1 6/2010 Martin et al.

* cited by examiner

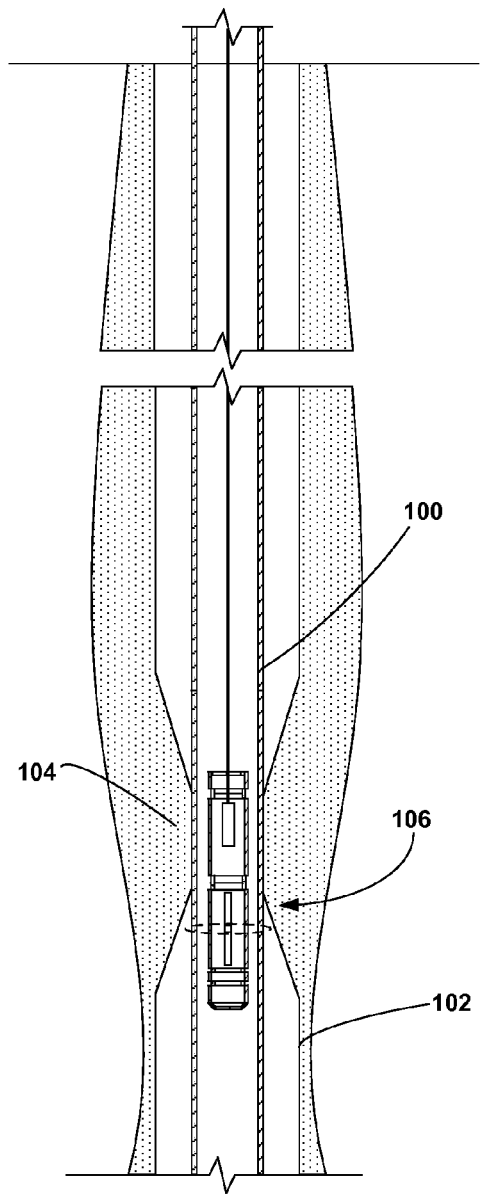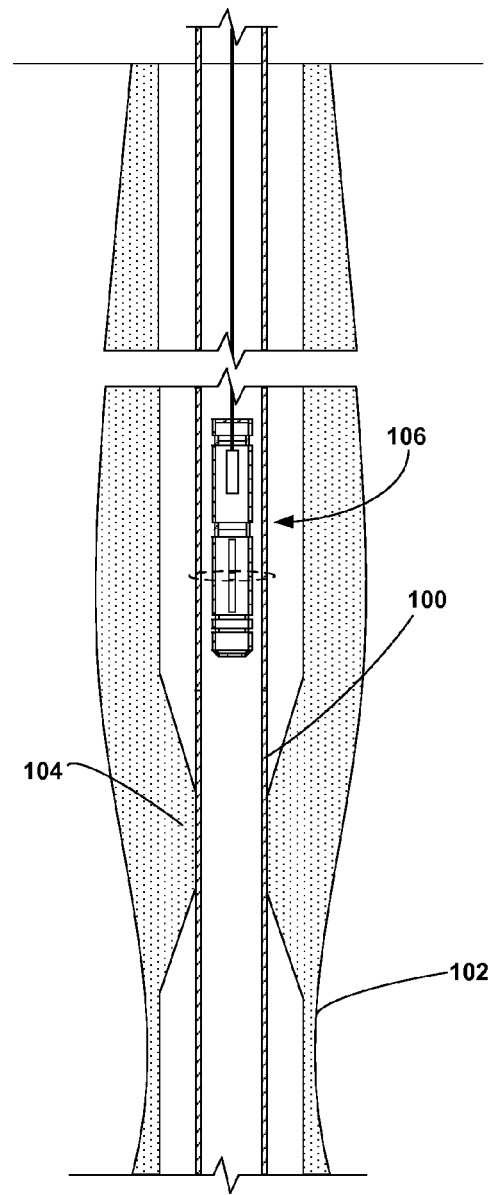
FIG. 7  FIG. 8

ENHANCED DEVICE FOR DETERMINING THE LOCATION OF INDUCED STRESS IN STUCK BOREHOLE TUBULARS

FIELD OF THE INVENTION

This invention relates generally to the field of drilling equipment and processes, and more particularly, but not by way of limitation, to methods and equipment for identifying the location of a stuck tubular within a borehole.

BACKGROUND

The recovery of petroleum products from subterranean reservoirs often involves the drilling of deep wells that extend from the surface to producing geologic formations. Modern wells are typically drilled using high-powered drilling rigs that penetrate through rock with rotating drill bits attached to a drill string. Once the drilling rig has completed some or all of its drilling operation, the resulting borehole is often lined with a metal casing. The casing prevents the deterioration of the borehole and controls the passage of fluids in and out of the well. A cementing operation secures the casing within the wellbore.

During the drilling or casing operation, there is a risk that the casing or drill string will become stuck in the well. The drill string or casing may become stuck due to a number of factors, including deviations in the borehole, operator error, partial collapse of the borehole or as a result of differential pressures and friction acting on the borehole and the tubular. The filter cake that forms along the inside of the wellbore may contribute to the stuck tubular.

There are a number of techniques practiced today for freeing a stuck tubular. These techniques include the use of vibration-inducing equipment or through the injection of spotting fluids at the level of the sticking point. If the remedial measures fail, it may become necessary to cut the tubular above the sticking point to maximize the recovery of the tubular from the well. For each of these remedial measures, it is important to accurately determine the location of the sticking point within the wellbore. Prevailing methods for determining where the sticking point is located include the use of complicated and expensive electromechanical instruments. There is, therefore, an ongoing need for an improved device and process for identifying the location of the binding point of a stuck tubular. It is to this and other objects that the presently preferred embodiments are directed.

SUMMARY OF THE INVENTION

In a preferred embodiment, the present invention provides a method for identifying the location of a binding zone between a stuck tubular and a borehole. The method includes the steps of passing a demagnetizing stress sensor through the tubular on a baseline magnetization pass to magnetize the tubular. The demagnetizing stress sensor measures a baseline magnetization of the tubular. Once the baseline magnetization has been established, the method continues by applying a stress to the tubular and passing the demagnetizing stress sensor through the tubular on a scanning pass while the tubular is stressed. The demagnetizing stress sensor then measures a stress-induced demagnetization of the tubular. The method concludes by comparing the baseline magnetization state of the tubular against the stress-induced magnetization of the tubular. Notably, in preferred embodiments, the method includes the magnetization of the tubular in a substantially radial direction and the stresses are applied in vectors perpendicular to the radial magnetization of the tubular.

In another aspect, the preferred embodiments include a device for identifying the location of a binding zone between a stuck tubular and a borehole. The device includes a pair of opposed, longitudinal magnets and a sensor configured to detect a magnetic field established in the tubular.

BRIEF DESCRIPTION OF THE DRAWINGS

FIG. 7. is an elevational depiction of the demagnetizing stress sensor being raised through the stuck tubular at the beginning of a scanning pass.

FIG. 8. is an elevational depiction of the demagnetizing stress sensor being raised through the stuck tubular at the end of a scanning pass.

DETAILED DESCRIPTION OF THE PREFERRED EMBODIMENTS

Figure 1:
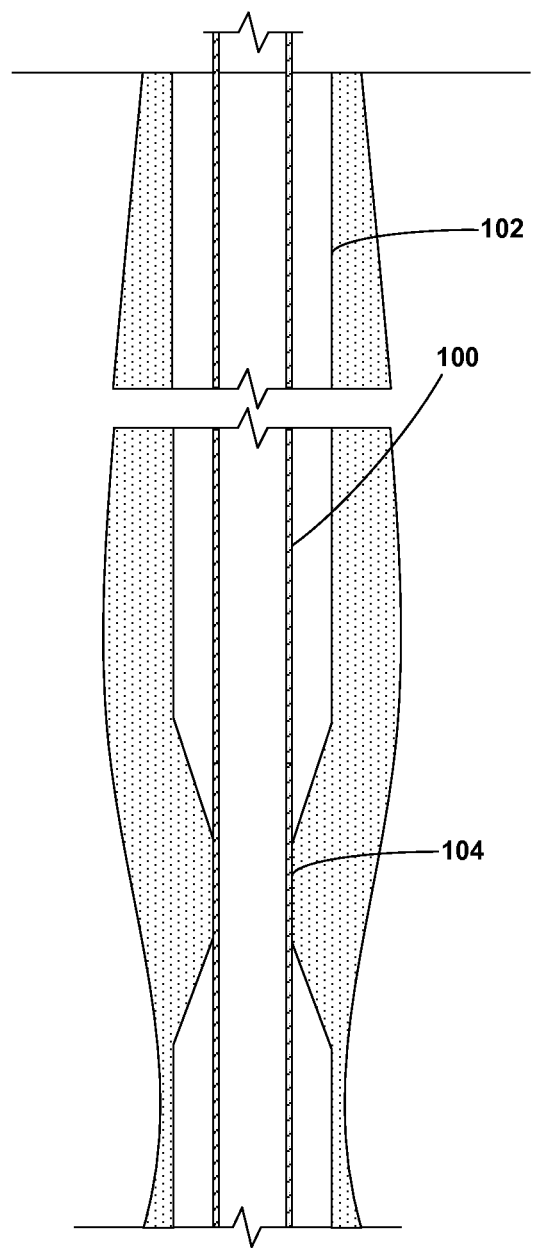
FIG. 1 is an elevational depiction of a wellbore that includes a stuck tubular.

In accordance with a preferred embodiment of the present invention, FIG. 1 shows an elevational view of a tubular 100 being positioned within a borehole 102. The borehole 102 may be drilled for the production of a fluid such as water or petroleum. As used herein, the term "petroleum" refers broadly to all mineral hydrocarbons, such as crude oil, gas and combinations of oil and gas. Unless otherwise distinguished, the term "tubular 100" will refer herein to any tubular component lowered into the borehole 102, including, but not limited to, well casing, drill string, downhole equipment strings, and production tubing. Although the preferred embodiments are disclosed with reference to a borehole 102, it will be appreciated the preferred embodiments may also find utility in identifying stuck tubulars in a well within which a casing has been installed.

As illustrated in FIG. 1, the tubular 100 has become stuck within the borehole 102 at a binding zone 104. It will be appreciated that the binding of the tubular 100 within the borehole 102 may result from any cause, including a deviated borehole, operator error, partial collapse of the borehole or as a result of differential pressures and/or friction acting on the borehole 102 and the tubular 100. It will be further appreciated that the binding zone 104 may be a small or large area between the borehole 102 and the tubular 100. For the present disclosure, however, it will be assumed that the binding zone 104 is preventing the extraction or rotation of the tubular 100.

Figure 2:
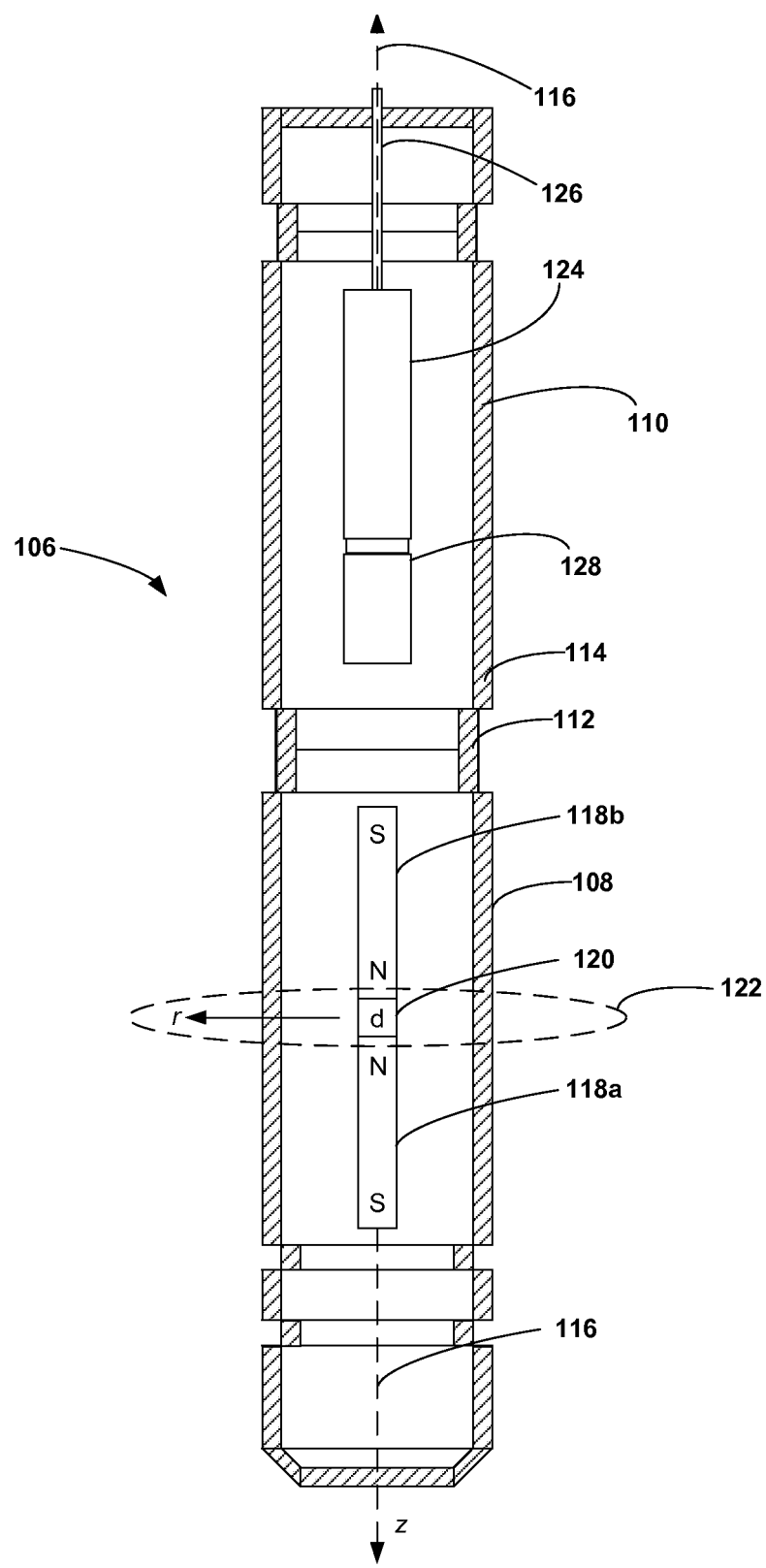
FIG. 2 is an elevational cross-sectional view of a demagnetizing stress sensor constructed in accordance with a presently preferred embodiment.

Turning to FIG. 2, shown therein is a cross-sectional view of a demagnetizing stress sensor 106 constructed in accordance with a presently preferred embodiment. The demagnetizing stress sensor 106 preferably includes a lower module 108, an upper module 110 and an isolating center module 112. Each of the lower module 108, upper module 110 and center module 112 preferably includes a module housing 114 constructed from a non-magnetic material, such as Inconel 718, that will protect the internal components from exposure to the pressures and contaminants within the borehole 102. In a particularly preferred embodiment, the lower module 108 is configured for threaded engagement with the center module 112, which is in turn configured for threaded engagement with the upper module 110. It will be appreciated that the proportions of the lower module 108, upper module 110 and center module 112 may vary depending on the requirements of a particular application. Additionally, it is contemplated that the separate modules could be replaced by a single, larger module. A longitudinal axis 116 extends through the center of the demagnetizing stress sensor 106 in the longitudinal (v) direction.

The lower module 108 includes a pair of permanent cylindrical magnets 118a, 118b mounted on the longitudinal axis 116 in such a way that the poles of the magnets 118a, 118b are opposed. As illustrated in FIG. 2, the "North" poles of the magnets 118a, 118b are positioned in an opposing orientation. The magnets 118a, 118b are preferably separated by a gap 120 that provides a distance "d" between the magnets 118a, 118b. The opposing, longitudinally-oriented permanent magnets 118a, 118b create a magnetic B field 122 that projects radially outward from the adjacent opposing poles of the magnets 118a, 118b. By adjusting the gap 120 between the magnets 118a, 118b, the magnetic B field can be optimized to provide the greatest magnetizing effect in the radial (r) direction.

The upper module 110 includes at least one sensor 124. The magnetic sensor 124 is configured to detect and measure a magnetic field emanating from outside the demagnetizing stress sensor 106. In a particularly preferred embodiment, the magnetic sensor 124 is configured to detect and measure a magnetic field in three axes. The magnetic sensor 124 may be a search coil, a Hall Effect sensor or giant magneto-resistance ("GMR") type sensors or similar devices suitable for the environment. The magnetic sensor 124 is preferably connected to surface-based recording instruments with an umbilical 126. Alternatively, the upper module 110 can be fitted with data storage devices 128 that are configured to record the output from the magnetic sensor 124.

The center module 112 preferably isolates the sensor 124 within the upper module 110 from the magnets 118a, 118b in the lower module 108. In this way, the sensor 124 is preferably prevented from detecting the magnetic fields produced by the magnets 118a, 118b.

Figure 3:
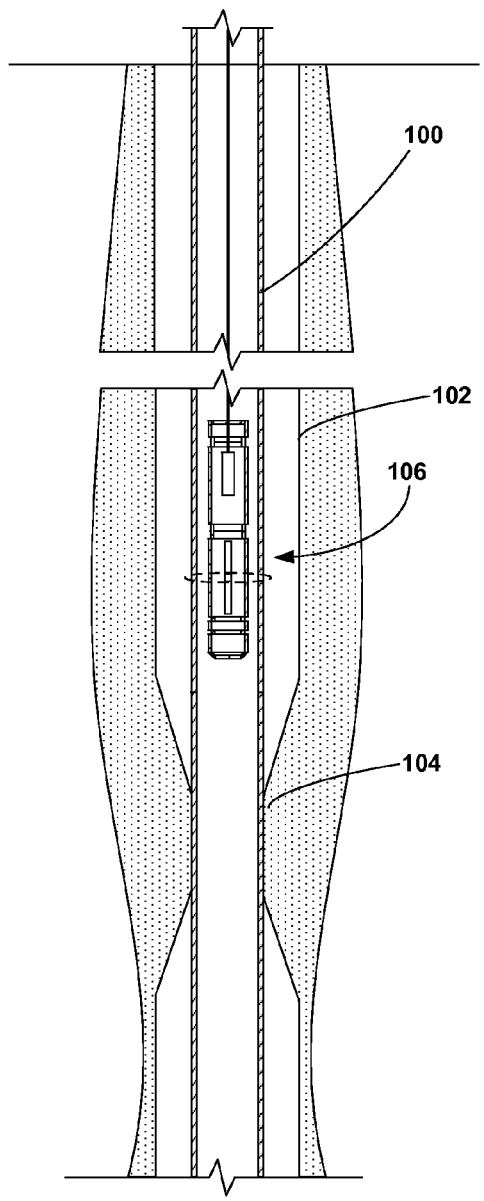
FIG. 3. is an elevational depiction of the demagnetizing stress sensor being lowered into the stuck tubular at the beginning of a baseline magnetization pass.
Figure 4:
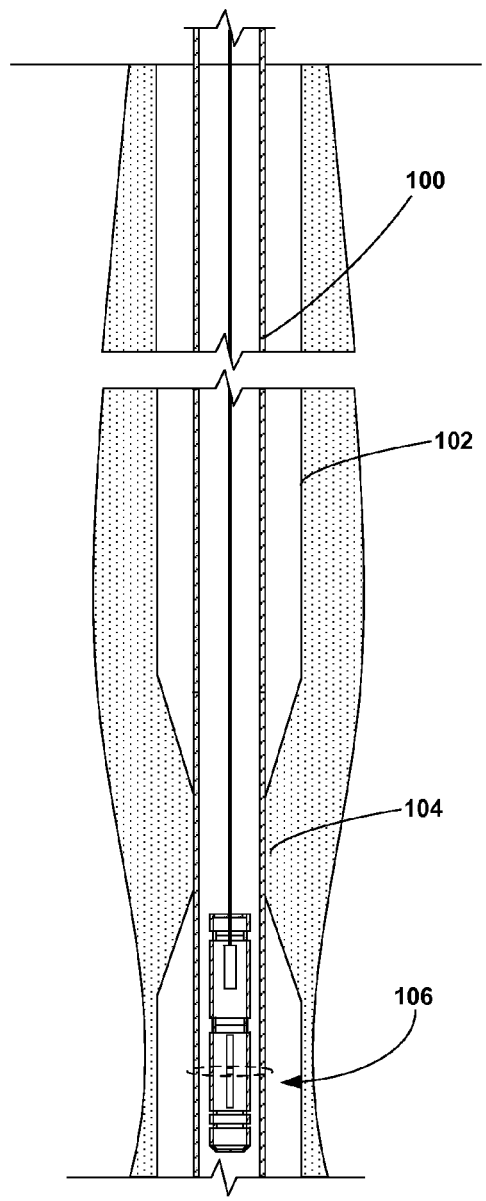
FIG. 4. is an elevational depiction of the demagnetizing stress sensor being lowered into the stuck tubular at the end of the baseline magnetization pass.

Turning to FIGS. 3 and 4, depicted therein is the lowering of the demagnetizing stress sensor 106 through the tubular 100. The demagnetizing stress sensor 106 can be lowered using conventional wireline, slickline and coiled tubing equipment. It will be appreciated that the borehole 102 may be pressurized, which would necessitate the use of blowout preventers or other surface-based equipment to permit the deployment of the demagnetizing stress sensor 106 within the live well. The demagnetizing stress sensor 106 may be deployed in applications where the borehole 102 has been filled with drilling mud in an overbalanced condition to prevent uncontrolled flow of fluids from the well.

As the demagnetizing stress sensor 106 is lowered through the tubular, it conducts a "baseline magnetization pass" in which the magnets 118a, 118b cause the tubular 100 to be magnetized. As the demagnetizing stress sensor 106 conducts the baseline magnetization pass, the sensor 124 records the magnetic field emitted from the magnetized tubular 100. The baseline magnetization along the length of the tubular 100 is recorded against depth using conventional surface-based depth counters. In this way, a precise record of the magnetization of the tubular 100 is generated that permits the operator to identify the baseline magnetization at any point along the length of the tubular 100. As noted in FIG. 4, the demagnetizing stress sensor 106 is preferably deployed to the bottom of the tubular 100 during the baseline magnetization pass. A baseline magnetization record 130 is illustrated in FIG. 7.

Figure 5:
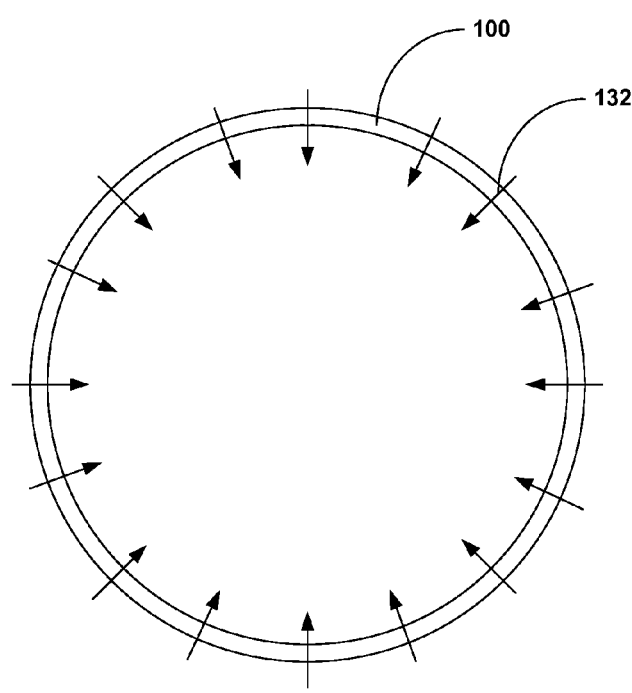
FIG. 5 is a cross-sectional depiction of the tubular showing the radial magnetization achieved by the demagnetizing stress sensor.

As the demagnetizing stress sensor 106 approaches any point within the tubular 100 during the baseline magnetization pass, the tubular 100 experiences a magnetizing field that is strongest at the radial magnetic B field 122. Significantly, the radially directed magnetic B field 122 produced by the demagnetizing stress sensor 106 causes the tubular 100 to be magnetized such that domains 132 within the tubular 100 are substantially oriented in a radial direction. As depicted in FIG. 5, the domains within the magnetized tubular 100 have undergone an alignment as a result of the baseline magnetization pass that causes the domains 132 to orient in a direction facing the center of the tubular 100, or away from the center of the tubular 100, depending on the orientation of the magnets 118a 118b. The ability to magnetize the tubular 100 in a substantially radial direction presents a significant improvement over the prior art.

Figure 6:
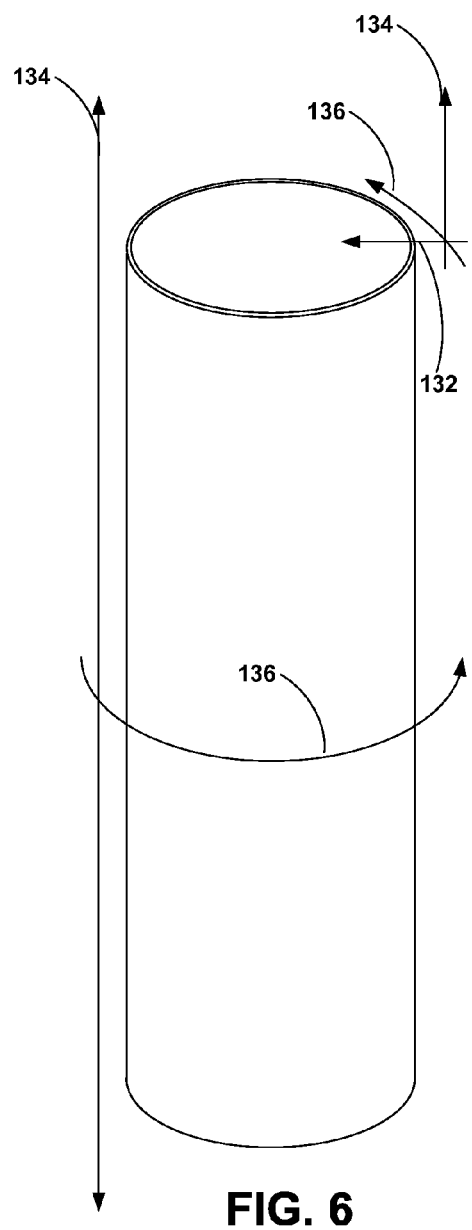
FIG. 6 is a perspective depiction of the tubular undergoing rotational and axial stresses.

Once the tubular 100 has been provided with a baseline magnetization (as shown in FIG. 4), the tubular 100 is exposed to mechanical stress. In a presently preferred embodiment, the tubular 100 is stressed in two ways. In no particular order, the tubular 100 is axially stretched by attempting to lift the tubular 100 with surface equipment. The tubular 100 is also exposed to a torsional stress by attempting to rotate the stuck tubular 100. As depicted in FIG. 6, the axial stress 134 and torsional stress 136 act in directions that are perpendicular to the radially-aligned domains 132. As these stresses are applied to the tubular 100, the domains 132 tend to rotate and orient to be parallel or antiparallel with the applied stress vector. The reorientation of the domains 132 and the resulting demagnetizing effect are more pronounced because the axial and circumferential vectors of the induced stresses act in a perpendicular direction to the radially-aligned domains 132.

Notably, these axial and torsional stresses 134, 136 are realized between the binding zone 104 and the application of the stresses at the surface. Since the binding zone 104 offsets and opposes these induced stresses, the portion of the tubular 100 below the binding zone 104 is not exposed to these stresses. As such, the stress-induced demagnetization is not as evident below the binding zone 104.

After the tubular 100 has been exposed to the axial and/or torsional stress, the demagnetizing stress sensor 106 is pulled back through the tubular 100 on a scanning pass as depicted in FIGS. 7 and 8. During the scanning pass, the sensor 124 records the magnetic fields produced by the stressed tubular 100 and produces a stress-induced magnetization record 138 (graphically depicted in FIG. 9). The tubular 100 can be expected to remain magnetized in those portions that have been isolated from the induced stresses. For the example depicted in FIGS. 7 and 8, it can be expected that the portion of the tubular 100 extending below the binding zone 104 will retain a significant portion of the baseline magnetization, while the portions of the tubular 100 above the binding zone 104 will be largely demagnetized by the induced stresses. By comparing the differences between the baseline magnetization record 130 and the stress-induced magnetization record 138 across the length of the tubular 100, the location of the binding zone 104 can be determined.

Figure 9:
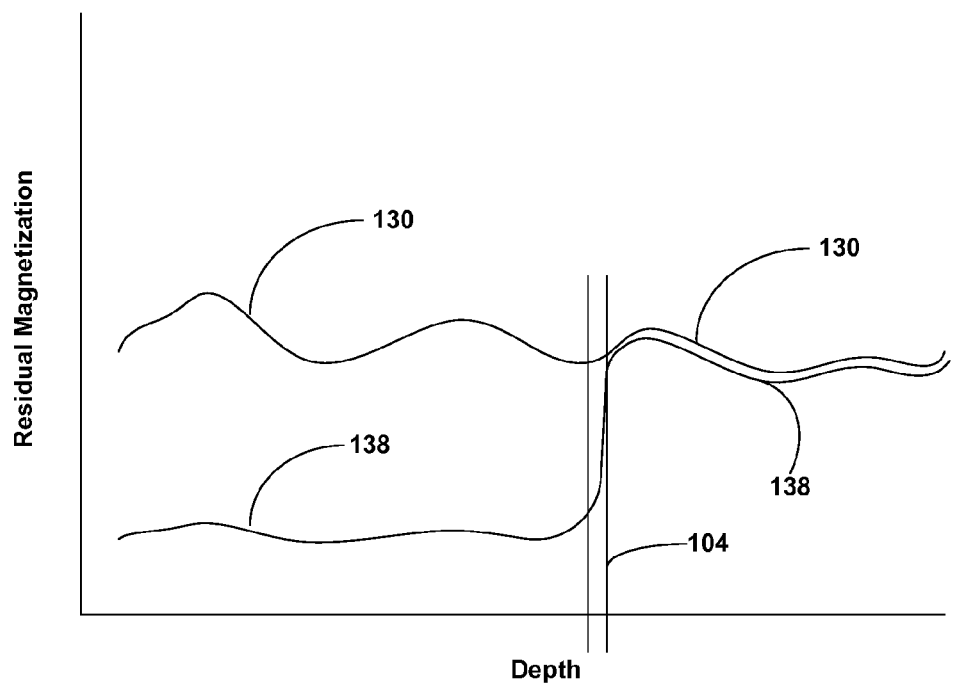
FIG. 9 is a graphical representation comparing the magnetization readings from before and after the application of stress to the stuck tubular.

Turning to FIG. 9, shown therein is graphical representation of the baseline magnetization record 130 and stress-induced magnetization record 138. The differences in the magnitude of magnetization of the tubular 100 during the baseline magnetization pass and the scanning pass reveal a significant demagnetization at depths above the binding zone 104. In contrast, at depths below the binding zone 104, the magnetization of the tubular 100 is largely unchanged between the baseline magnetization pass and the subsequent scanning pass of the demagnetizing stress sensor 106. Accordingly, using a graphical comparison of the baseline magnetization pass and post-stress scanning pass, the operator can quickly identify a transition zone that indicates the binding zone 104 where the tubular 100 is stuck. It will be understood that the graphical representation of FIG. 9 is merely exemplary and that other methods of comparing the magnetization of the tubular 100 can be used with equal success. For example, an alternate preferred embodiment includes a computer software program that automatically compares the values of the baseline magnetization record 130 against the values of the stress-induced magnetization record 138 and outputs a report that identifies an area within the tubular 100 that indicates a transition region indicative of the binding zone 104.

In an alternate preferred embodiment, the identification of the binding zone 104 is determined without the use of the baseline magnetization record 130. Instead, the method includes an assumption that the tubular 100 is uniformly magnetized during the baseline magnetization pass. During the subsequent scanning pass, any significant demagnetization from the uniform magnetization would represent the location of the binding zone 104.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A method for identifying the location of a binding zone between a stuck tubular and a borehole, the method comprising the steps of:
providing a magnetizing module having a longitudinal axis, wherein the step of providing a magnetizing module further comprises the step of orienting two permanent, longitudinal magnets along the longitudinal axis of the magnetizing module in an opposing magnetic orientation to produce a magnetic B field that extends in a substantially radial direction;
magnetizing the tubular with the magnetizing module;
applying a stress to the tubular;
passing a magnetic field sensor through the tubular on a scanning pass;
measuring a stress-induced demagnetization of the tubular with the magnetic field sensor; and
analyzing the stress-induced demagnetization of the tubular to identify locations within the tubular that are exposed to increased stress.

2. The method of claim 1, wherein the step of magnetizing the tubular further comprises:
passing the magnet through the tubular on a baseline magnetization pass to magnetize the tubular; and
measuring the baseline magnetization of the tubular with the magnetic field sensor.

3. The method of claim 2, wherein the analyzing step further comprises comparing the baseline magnetization of the tubular against the stress-induced magnetization of the tubular comprises graphically plotting the baseline magnetization against the stress-induced magnetization.

4. The method of claim 2, wherein the step of measuring a baseline magnetization of the tubular is conducted during the baseline magnetization pass.

5. The method of claim 2, wherein the step of passing the magnet through the tubular on a baseline magnetization pass further comprises the step of magnetizing the tubular in a substantially radial direction.

6. The method of claim 1, wherein the step of applying a stress to the tubular comprises lifting the stuck tubular to create an axial stress.

7. The method of claim 1, wherein the step of applying a stress to the tubular comprises applying a torque to the tubular to create a torsional stress.

8. The method of claim 1, wherein the step of applying a stress to the tubular comprises applying an axial stress and a torsional stress.

9. A method for magnetizing a stuck tubular within a wellbore, the method comprising the steps of:
providing a magnetizing module having a longitudinal axis, wherein the step of providing a magnetizing module further comprises the step of orienting two permanent, longitudinal magnets along the longitudinal axis of the magnetizing module in an opposing magnetic orientation to produce a magnetic B field that extends in a substantially radial direction; and
passing the magnetizing module through the tubular on a baseline magnetization pass to magnetize the tubular in a predominately radial direction.

10. A device for detecting the location of a binding zone between a stuck tubular and a borehole, the device comprising:
a first magnet having an interior magnetic pole and an exterior magnetic pole;
a second magnet having an interior magnetic pole and an exterior magnetic pole, wherein the interior magnetic poles of the first and second magnets are of like polarity and positioned proximate to one another within the device; and
a sensor.

11. The device of claim 10, wherein the first and second magnets are longitudinal magnets, and wherein the first and second longitudinal magnets are oriented in a magnetically opposed manner to create a magnetic B field extending in a radial direction.

12. The device of claim 10, further comprising a lower module, an upper module and a center module between the upper and lower modules.

13. The device of claim 12, wherein the first and second magnets are located within the lower module.

14. The device of claim 13, wherein the sensor is located within the upper module.

15. The device of claim 12, wherein each of the upper, lower and center modules includes a housing manufactured from a non-magnetic material.

16. The device of claim 10, wherein the sensor is selected from the group consisting of search coils, Hall Effect sensors and giant magnetoresistance (GMR) sensors.

17. The device of claim 16, further comprising a plurality of sensors.

18. The device of claim 10, further comprising an umbilical extending from the sensor.

19. The device of claim 10, wherein the tubular is a well casing.

20. The device of claim 10, wherein the tubular is a drill string.

21. The device of claim 10, further comprising a monitor for displaying the measurements made by the sensor.

* * * * *